Patented Oct. 8, 1940

2,217,354

UNITED STATES PATENT OFFICE 2,217,354

MANUFACTURE OF METHYL BORATE

Frank J. Appel, Wilmington, Del., assignor to E. I. du Pont de Nemours & Company, Wilmington, Del., a corporation of Delaware No Drawing. Application June 10, 1939, Serial No. 278,485

10 Claims. (Cl. 260—462)

This invention relates in general to the manufacture of methyl borate, and more particularly to its manufacture from methanol. Still more particularly, it is concerned with a new method of manufacturing methyl borate directly from boric acid.

Heretofore, methyl borate has been prepared by the classic method of Schiff, Ann. (Supp.) 5, 154 (1867), who made the boric acid triesters by reacting boric anhydride with the alcohol corresponding to the ester desired. The yield is very low, and the method is open to the further objections that boric oxide is quite hygroscopic, cakes on the reaction vessel, and must be very finely divided to secure even a fair rate of reaction. Another method for manufacturing methyl borate upon a commercial scale is that described in U. S. Patent No. 2,088,935, wherein boric acid is reacted with normal butanol in accordance with the method of U. S. Patent No. 1,668,797, and thereafter the normal butyl borate is subjected to an alcoholysis reaction with methanol to produce trimethyl borate. It will be apparent that this is a circuitous method of manufacturing methyl borate from boric acid.

This invention has as a principal object, the production of methyl borate, and has as a further object a novel method for the manufacture of methyl borate from boric acid. Another object of the invention is to produce a methyl borate-methanol mixture, which is admirably suited for use as a vaporous flux in gas-welding operations.

These and other objects hereinafter apparent are accomplished according to this invention by heating boric acid with methanol, fractionally distilling the reaction mixture, and recovering the methyl borate thereby formed.

It has now been found that methyl borate can be prepared in yields which approach quantitative proportions by reacting methanol directly with boric acid. Methanol, preferably in excess of stoichiometric proportions for reasons hereinafter explained, is mixed with boric acid, the mixture is placed in a distilling vessel fitted with an efficient fractionating column, condenser, and receiver, and is carefully distilled. A calcium chloride tube is attached to the receiver or other suitable precaution taken to prevent hydrolysis of the product. The methyl borate distills over as a binary azeotropic mixture with methanol, leaving in the stillpot the water of reaction, excess methanol, and some solids recoverable by evaporation including any unreacted boric acid. The methyl borate-methanol azeotrope boils at 54.2° C. under atmospheric pressure, and contains 75.7% by weight of methyl borate. However, when using ordinary laboratory distilling equipment, a binary containing only about 71% to 73% by weight of methyl borate is obtained, which accords with the literature. Pure methyl borate boils at 68.7° C. under atmospheric pressure.

It is to be understood that where percentage compositions are given herein, the relative proportions are by weight. It is also to be understood that where the expression "methyl borate" is used, trimethyl borate is meant.

While the reaction proceeds satisfactorily if a theoretical mole ratio of methanol to boric acid to produce the 73% methyl borate-27% methanol binary is used, an excess of methanol is preferred because the reaction proceeds more rapidly. It has also been found that the reaction may be still further accelerated if, instead of the constant-boiling azeotrope, a mixture containing from about 40% to 75% methyl borate in methanol is distilled from the reaction mixture by allowing the still-head temperature to rise above the boiling point of the azeotrope and refractionating the product. By this method of working, a methanol-methyl borate binary containing about 75.7% methyl borate may be produced in efficient distillation equipment, while a 72% methyl borate binary is readily obtained in laboratory apparatus.

When it is desired to separate the pure methyl borate from mixtures thereof with methanol, this may be done by washing the mixture with cold concentrated sulfuric acid, separating the two layers, recovering the upper layer and redistilling.

Catalysts may be used to accelerate the esterification, if desired, but the boric acid and methanol are preferably reacted without the employment of catalysts, since the yields approach quantitative proportions and the reaction proceeds with ample speed. Super-atmospheric and subatmospheric pressures may be employed, but atmospheric pressure is preferred, since the yield as stated above approaches quantitative, and equipment is simplified thereby.

The following examples are illustrative of the invention:

*Example 1.*—146.6 grams of boric acid and 227 grams of methanol were charged into a glass distilling flask surmounted by a fractionating column. The column employed was 30 inches high, ¾ inch in diameter and packed with ¼ inch glass tubing cut into ¼ inch lengths. The mixture was refluxed for 1 hour and then fractionated. During the course of the distillation, 200.5 grams and later 201.9 grams of methanol were added to the still pot, increasing the total amount of methanol to 629.4 grams and making a molar ratio of methanol to boric acid of 8.28 to 1. The following cuts were removed in the distillation at atmospheric pressure:

| Cut No. | Temperatures, °C | | | | Time of dist., hrs. | Weight of dist., gms. | Composition |
|---|---|---|---|---|---|---|---|
| | Oil bath | Still pot | Middle of column | Head of column | | | |
| 1 | 93–111 | 70–76 | 41–51 | 54–56 | 26.0 | 304.7 | 221.0 gr. $(CH_3O)_3B$. 83.7 gr. MeOH. |
| 2 | 111–130 | 74–76 | 52–56 | 56–64 | 6.5 | 79.1 | 13.6 gr. $(CH_3O)_3B$. 65.5 gr. MeOH. |
| 3 | 109–138 | 72–101 | 53–92 | 64–66 | 4.0 | 246.5 | 246.5 gr. MeOH. |
| 4 | 138–139 | 101–105 | 92–102 | 66–100 | 1.0 | 6.2 | MeOH–$H_2O$. |
| 5 | 138–139 | 102–105 | 100 | 100 | 3.3 | 101.5 | 101.5 gr. $H_2O$. |

A small amount of white residue (probably $H_3BO_3$) remained in the still pot. The distillation was terminated at a 95.3% yield of the methyl borate, based on the boric acid, because the reaction was, at this point, very slow. Of this yield, 94.2% was recovered in cut (1) and 5.8% in cut (2). During the distillation, a calcium chloride tube was connected to the vent line of the receiver to prevent hydrolysis of the methyl borate. A material balance across the still indicated a loss of 3.9%. If desired, the total amount of methanol may be added at the beginning of the distillation.

*Example 2.*—355 pounds of boric acid was charged into a 200-gallon stainless steel still together with 1247 pounds of methanol. The still was equipped with calcium chloride tubes on the still vent and on the receivers. The still was put on total reflux for two hours, and thereafter binary was removed as fast as possible maintaining the head temperature at 54° C. to 56° C. The production averaged 26 pounds per hour the first 6 hours, 14.5 pounds per hour for the next 15 hours and 10.3 pounds per hour for the last 23-hour period. The product averaged 63.5% methyl borate during the last period.

621 pounds of the binary was recharged for redistillation. 375 pounds of 75% binary was obtained at the rate of 94 pounds per hour and 151.5 pounds of 71% binary at 75 pounds per hour. Finally, 49 pounds of 51.9% binary was removed as intermediates. A further redistillation of the 69.5% binary at a high reflux ratio produced a 75.7% methyl borate fraction boiling at 54.2° C. The yield was 414 pounds of 100% methyl borate or 69.5% based on the boric acid charged.

A reflux ratio of 10:1 up to 80:1 or higher has been found desirable, but reflux ratios of 15:1 up to 30:1 are to be preferred. For complete recovery, the reflux ratio may be as high as 600:1 near the end of the reaction.

A stainless steel still was used, but it has also been found that copper is a desirable material of construction and in fact almost any of the usual materials of construction may be used.

Although a considerable excess of methanol is employed, nevertheless, yields superior to any prior method of producing methyl borate are secured by using a quantity of methanol in the theoretical molar ratio, i. e. 4.19:1, of methanol to boric acid to produce the 73% methyl borate-27% methanol binary. Molar ratios of 10 to 1; 12 to 1 or higher may be used. Methyl borate is, however, produced when a molar ratio of methanol to boric acid of less than theoretical, for example, 2:1, is used, but the yield based on boric acid employed is reduced.

By recycling the recovered methanol and reutilizing the product remaining in the still, the yield may be raised to more than 80%, and by lengthening the time of esterification, the yield may be still further increased.

It will be apparent that the invention provides a novel and superior method of manufacturing methyl borate directly from boric acid and methanol.

Various changes may be made in the invention without departing from the spirit and scope thereof.

I claim:

1. The process comprising heating methanol with boric acid and subjecting the mixture to fractional distillation at a temperature at least as high as the boiling point of the methanol—methyl borate azeotrope but below that at which a substantial amount of the water of reaction will likewise be distilled over.

2. The process of claim 1 wherein methanol is employed in excess of stoichiometric proportions.

3. The process comprising heating excess methanol with boric acid, submitting the reaction mixture to azeotropic, fractional distillation at a still-head temperature of from 54.2° C. to 66° C. and condensing methyl borate admixed with methanol, while preventing access of atmospheric moisture to the condensate.

4. The process for the production of methyl borate which comprises heating boric acid with methanol, and separating from the mixture by fractional distillation a substantially anhydrous azeotrope of methyl borate and methanol.

5. The process of claim 4 wherein methanol is employed in excess of stoichiometric proportions.

6. The process of claim 4 wherein methanol in excess of stoichiometric proportions is employed and the methanol-methyl borate fraction is further fractionally distilled to produce an azeotropic binary mixture containing at least 72% by weight of methyl borate.

7. The process comprising heating methanol with boric acid, fractionally distilling at a temperature at least as high as the boiling point of the methanol-methyl borate azeotrope, but below that at which substantial amounts of the water of reaction will likewise be distilled over, separating a primary condensate of methanol and methyl borate, subjecting the primary condensate to a further fractional distillation to obtain a recovered methanol fraction and an azeotropic methanol-methyl borate fraction, and further reacting the recovered methanol fraction with boric acid.

8. The process of claim 7 wherein the water of reaction is separated from the unreacted boric acid and the recovered methanol fraction is returned for further reaction.

9. The process of claim 7 wherein the primary condensate contains from 40% to 75% by weight of methyl borate.

10. The process of claim 7 wherein the azeotropic methyl borate-methanol fraction contains at least 72% by weight of methyl borate.

FRANK J. APPEL.